United States Patent
Kriete et al.

(10) Patent No.: US 11,108,267 B2
(45) Date of Patent: Aug. 31, 2021

(54) SYSTEM AND METHOD FOR MANAGING CURRENT OF A NOTIFICATION APPLIANCE CIRCUIT

(71) Applicant: Siemens Industry, Inc., Alpharetta, GA (US)

(72) Inventors: Richard Kriete, Hazlet, NJ (US); Eugene Mastroianni, Clifton, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 87 days.

(21) Appl. No.: 16/557,738

(22) Filed: Aug. 30, 2019

(65) Prior Publication Data
US 2021/0066960 A1 Mar. 4, 2021

(51) Int. Cl.
| | |
|---|---|
| *H02J 13/00* | (2006.01) |
| *G08B 1/08* | (2006.01) |
| *G08B 17/00* | (2006.01) |
| *G08B 27/00* | (2006.01) |
| *H02J 7/00* | (2006.01) |

(52) U.S. Cl.
CPC ............ *H02J 13/0003* (2013.01); *G08B 1/08* (2013.01); *G08B 17/00* (2013.01); *G08B 27/00* (2013.01); *H02J 7/0013* (2013.01)

(58) Field of Classification Search
CPC ........ G08B 25/04; G08B 28/18; G08B 27/00; G08B 1/08; G08B 17/00; H02J 12/0003; H02J 7/0013
USPC ................... 340/577, 578, 628–630
See application file for complete search history.

(56) References Cited

U.S. PATENT DOCUMENTS

| | | | | |
|---|---|---|---|---|
| 3,025,506 | A * | 3/1962 | McDonough | G08B 13/183 340/556 |
| 5,559,492 | A * | 9/1996 | Stewart | G08B 5/36 340/331 |
| 7,663,500 | B2 * | 2/2010 | Curran | G08B 5/38 340/815.45 |
| 7,907,047 | B2 * | 3/2011 | Curran | G08B 25/04 340/293 |
| 8,354,798 | B2 * | 1/2013 | Redjebian | H05B 41/34 315/240 |
| 8,796,931 | B2 * | 8/2014 | Savage, Jr. | H05B 45/00 315/85 |
| 10,325,481 | B2 | 6/2019 | Kriete et al. | |
| 2009/0322526 | A1 | 12/2009 | Lontka | |

(Continued)

OTHER PUBLICATIONS

PCT Search Report dated Oct. 27, 2020, for PCT Application No. PCT/US2020/047100, 12 pages.

*Primary Examiner* — Eric Blount

(57) ABSTRACT

There is provided an alarm system and method for managing current of a notification appliance circuit. The system comprises a notification appliance circuit, in which a control panel and notification appliances are coupled to the notification appliance circuit. The control panel provides an activation signal in response to an emergency condition. The notification appliances are configured with time delays and receive an activation signal from the control panel. The notification appliances discharges energy storage components based on at least the activation signal and recharges the energy storage components at different time intervals based on the time delays in response to discharging the energy storage components.

21 Claims, 10 Drawing Sheets

(56) References Cited

U.S. PATENT DOCUMENTS

| | | | |
|---|---|---|---|
| 2010/0265080 A1* | 10/2010 | Henson | G08B 25/04 340/657 |
| 2015/0296599 A1 | 10/2015 | Recker et al. | |
| 2017/0345286 A1 | 11/2017 | Liang et al. | |
| 2018/0130341 A1 | 5/2018 | Feltham et al. | |
| 2018/0204429 A1* | 7/2018 | Savage, Jr. | G08B 7/066 |
| 2019/0103013 A1 | 4/2019 | Kriete et al. | |
| 2019/0196561 A1* | 6/2019 | Robotham | H02J 7/0071 |
| 2019/0289691 A1* | 9/2019 | Robotham | H02J 7/0072 |

* cited by examiner

SYSTEM AND METHOD FOR MANAGING CURRENT OF A NOTIFICATION APPLIANCE CIRCUIT

FIELD OF THE INVENTION

This application relates to the field of fire alarm systems for managing notification appliance circuits and, more particularly, to a system and method of a fire alarm system for managing current between a control panel and notification appliances.

BACKGROUND

Fire alarm systems encompass a wide variety of devices that aid in the monitoring and notification of various aspects of emergency events. The elements of a fire alarm system may be widely dispersed throughout a facility or campus. For example, the system may include one or more notification appliances located at various locations of a building so that as many occupants as possible are alerted to fire or other life-threatening emergencies. Different areas of a facility or campus may have varying structural settings thus requiring many notification appliances for full visual and audible coverage. Examples of notification appliances include strobes, speakers, horns, and bells.

A notification appliance circuit ("NAC") connects a control panel, or module, to a group of notification appliances. The notification appliance circuit receives power and synchronization or communication signals from the control panel and provide electrical energy to the notification appliances. Connected notification appliances may use a significant amount of stored energy and need replenishment from the control panel, resulting in a momentarily high electrical current surge called an "inrush".

An inrush current by an individual notification appliance may be relatively high and increase as more notification appliances are placed on a single common notification appliance circuit. Inrush currents on the notification appliance circuit may increase additively with the number of notification appliances and place an excessive demand on the control panel and/or notification appliance circuit. The excessive demand may cause impractical and expensive notification appliance circuit designs while introducing undesirable field wiring constraints and disturbances. Tus, inrush currents are problematic, particularly as more sophisticated notification appliances enter the market.

In order to limit inrush currents, existing designs make use of voltage reducing electronic components or circuits to reduce the inrush magnitude from individual notification appliances. Simpler designs may implement a single small value resistor in series with the input power line, and more complex designs may use active devices like transistors to drop the incoming voltage until a constant input current is reached. Other designs may use active switching to select several voltage dropping components switched in at various time intervals or power interrupting methods such as pulse switching or pulse width modulation. These approaches suffer from various drawbacks, such as adding complexity and cost to a design, causing side effects, wasting energy (dissipating as heat and potentially reducing the useable lifespan of products), and/or introducing electrical noise.

SUMMARY

There is described a charge division multiplexing approach for inrush current mitigation of notification appliances. The approach reduces inrush current subjected to a control panel by the notification appliances. In particular, each notification appliance includes components to spread or multiplex inrushes by multiple notification appliances over an extended time period.

The charge division multiplexing approach manages inrush current of notification appliances while providing several other advantages to the notification appliance circuit. The approach minimizes the need for a large, heavy-duty, expensive, cumbersome, components of the control device, such as the power supply of the control device. The approach also allows for more notification appliances to be connected to a single notification appliance circuit, reduces the need for heavy gauge field wires for the notification appliance circuit, and reduces any voltage drop that occurs over long lengths of wire so that more notification appliance circuits may be implemented. The approach further reduces current surges in the wires of the notification appliance circuit which in turn reduces the potential for electromagnetic interference, electrical noise disturbances, and interference with other systems. Communication pulse distortions may also be minimized.

One aspect is an alarm system for managing current of a notification appliance circuit. The system comprises a notification appliance circuit, a control panel coupled to the notification appliance circuit, and multiple notification appliances coupled to the notification appliance circuit. The control panel provides an activation signal in response to an emergency condition. The multiple notification appliances are configured with time delays, receive an activation signal from the control panel, discharge energy storage components based on at least the activation signal, and recharge the energy storage components at different time intervals based on the time delays in response to discharging the energy storage components.

Another aspect is a method of an alarm system for managing current of a notification appliance circuit. Multiple notification appliances are configured with time delays. The multiple notification appliances receive an activation signal in response to an emergency condition from a control panel coupled to the plurality of notification appliances via a notification appliance circuit. The multiple notification appliances discharge energy storage components based on at least the activation signal and recharge the energy storage components at different time intervals based on the time delays in response to discharging the energy storage components.

Still another aspect is a notification appliance of an alarm system for managing current of a notification appliance circuit. The notification appliance comprises an interface component, a processor, and an energy storage component. The interface component is configured to receive an activation signal in response to an emergency condition from a control panel coupled to the notification appliances via a notification appliance circuit. The processor is configured with a time delay. The energy storage component is configured to be discharged based on at least the activation signal and recharged at a time interval based on the time delay in response to discharging the energy storage component.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
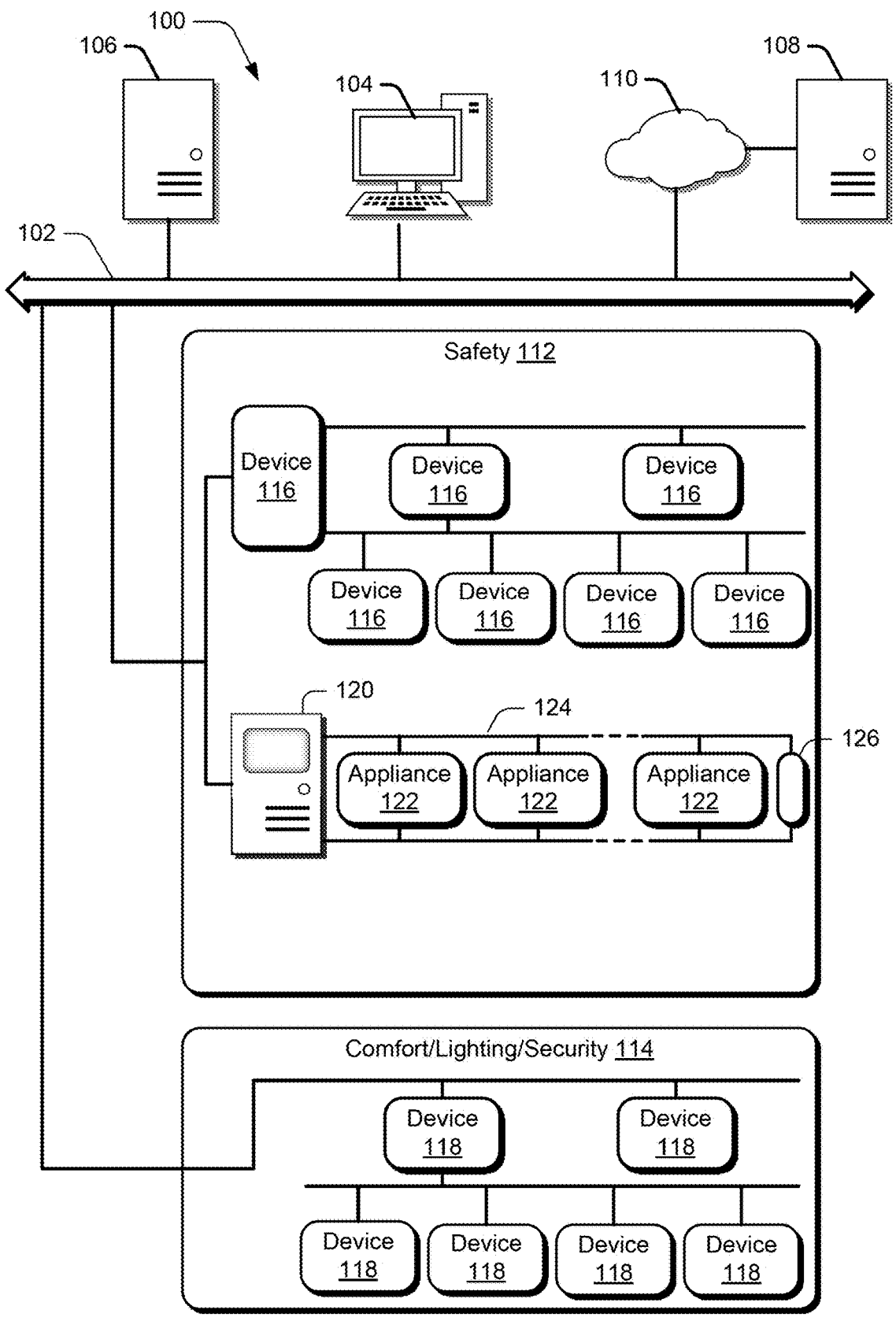
FIG. 1 is an illustration of a building management system that is operable to support an example implementation of the employed techniques described herein.

Various technologies that pertain to systems and methods that facilitate management of current of a notification appliance circuit for an alarm system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Multiple notification appliances on a common notification appliance circuit have an additive behavior with regard to current draw. A notification appliance draws current when initially powering-up and re-charging its energy storage thereafter, so multiple appliances operating in sync may draw multiple times the current of a single appliance. The notification appliances may be synchronized, consume stored energy simultaneously, and re-charge their energy storage simultaneously, thus causing an inrush condition. A control panel, such as a notification appliance circuit driver or line card of the control panel, powering these notification appliances would therefore need to be capable of supplying sufficient current for those time periods when all appliances may draw current simultaneously. A hefty and expensive power supply may be needed since the notification appliances may require this amount of current frequently.

For alarm systems, the inrush condition of the notification appliance circuit may only last for small intervals of time, i.e., a fraction of a second. For some embodiments, the maximum current draw of the inrush condition may be about $\frac{1}{10}^{th}$ of a second (i.e., 100 milliseconds). Therefore, the techniques described herein may minimize the need for an expensive, continuously high current, power supply for components of control panels and other devices of the alarm system.

The alarm system utilizes charge division multiplexing for managing current of a notification appliance circuit spreads-out in time the current drawn during an inrush condition ("inrush currents") from individual notification appliances. This asynchronous behavior by the notification appliances may be implemented by utilizing a delay offset of duration determined by various techniques described in this disclosure. Additionally, one or more notification appliances, particularly their current loads, may be inserted within the same time delay period or slot (e.g., overlapping time periods) depending on the requirements of inrush current of one or more notification appliances and the capacity of the power supply of the control panel.

The time delays are associated with the initial time for charging or recharging the energy storage components. It is to be understood that visual and/or audio output, such as strobe flashes or audible sounds, are independent of the time delays. The flashes or sounds are synchronized by the notification appliance circuit driver via sync pulses or control messages and may occur simultaneously, or substantially simultaneously, on all notification appliances. The time delays are offsets at which the charging or recharging of the energy storage components within each notification appliance begins and do not impact the flashes or sounds.

Referring to FIG. 1, there is illustrated an example building management system 100 for implementing an alarm system for managing current of a notification appliance circuit. The building management system 100 may include a communication bus 102 or similar communication means so that the various devices of the system 100, whether an internal or external to the system, may interconnect and communicate with each other. For some embodiments, the building management system 100 may comprise one or more management devices, such as a management workstation 104, a management server 106, or a remote management device 108 connecting through a wired or wireless network connection 110, that allows the setting and/or changing of various controls of the system. While a brief description of the building management system 100 is provided below, it will be understood that the system described herein is only one example of a particular form or configuration for a building management system and that the system may be implemented in any other suitable manner without departing from the scope of this disclosure.

For the embodiment represented by FIG. 1, the building management system 100 provides connectivity to associated systems for various environmental parameters such as components of safety system 112 and other systems 114, such as comfort systems, lighting systems, and security systems. For example, a safety system 112 may include various devices 116 for monitoring and controlling fire protection for areas within a building or a group of buildings Examples of safety devices include, but are not limited to, alarm systems, controllers, control panels, detectors, video surveillance cameras, and the like. Similarly, other systems 114 may include various devices 118 for monitoring and controlling heating, cooling, ventilation, lighting, and activities of areas within a building or group of buildings. Examples of comfort devices include stations, field panels, field controllers, field devices, and the like; examples of lighting devices include light fixtures, light sensors, illumination controllers, and the like; and examples of security devices include video surveillance cameras, motion detectors, portal controls, and the like. Some devices may communicate through the communication bus 102, and some devices may communicate directly or wirelessly with other devices. It is to be understood that the building management system 10) may comprise any suitable number of any of devices and components based on a particular configuration for each building or group of buildings.

As shown in FIG. 1, the safety system 112 of the building management system 100 may include an alarm system for managing notification appliances. The alarm system may include a control panel 120 communicating with multiple notification appliances 122 via a notification appliance circuit ("NAC") 124. The control panel 120 is coupled to the notification appliance circuit 124, and the control panel provides an activation signal in response to an emergency condition. The notification appliances 122 are coupled to the notification appliance circuit 124, and the notification appliances are configured with time delays, receive the activation signal from the control panel 120. The notification appliances 122 also discharge energy storage components based on at least the activation signal and recharge the energy storage components at different time intervals based on the time delays in response to discharging the energy storage components.

The notification appliance circuit 124 is a physical wire loop that provides power to notification appliances 122, so the notification appliance circuit supervises the wires that make up the circuit as opposed to the notification appliances themselves. The notification appliance circuit 124 extends from the control panel 120 at one end of the circuit to a terminator 126 at the other end of the circuit, coupling to notification appliances 122 therebetween. The notification appliances 122 are located within as facility as connected by the physical wire loop of the notification appliance circuit 124. Examples of the notification appliances 122 include, but are not limited to, strobes, speakers, horns, bells, and other visual and/or audio output devices. It is to be understood that the alarm system may comprise any suitable number of any of devices and/or components based on particular configurations for each facility or group of facilities.

Figure 2:
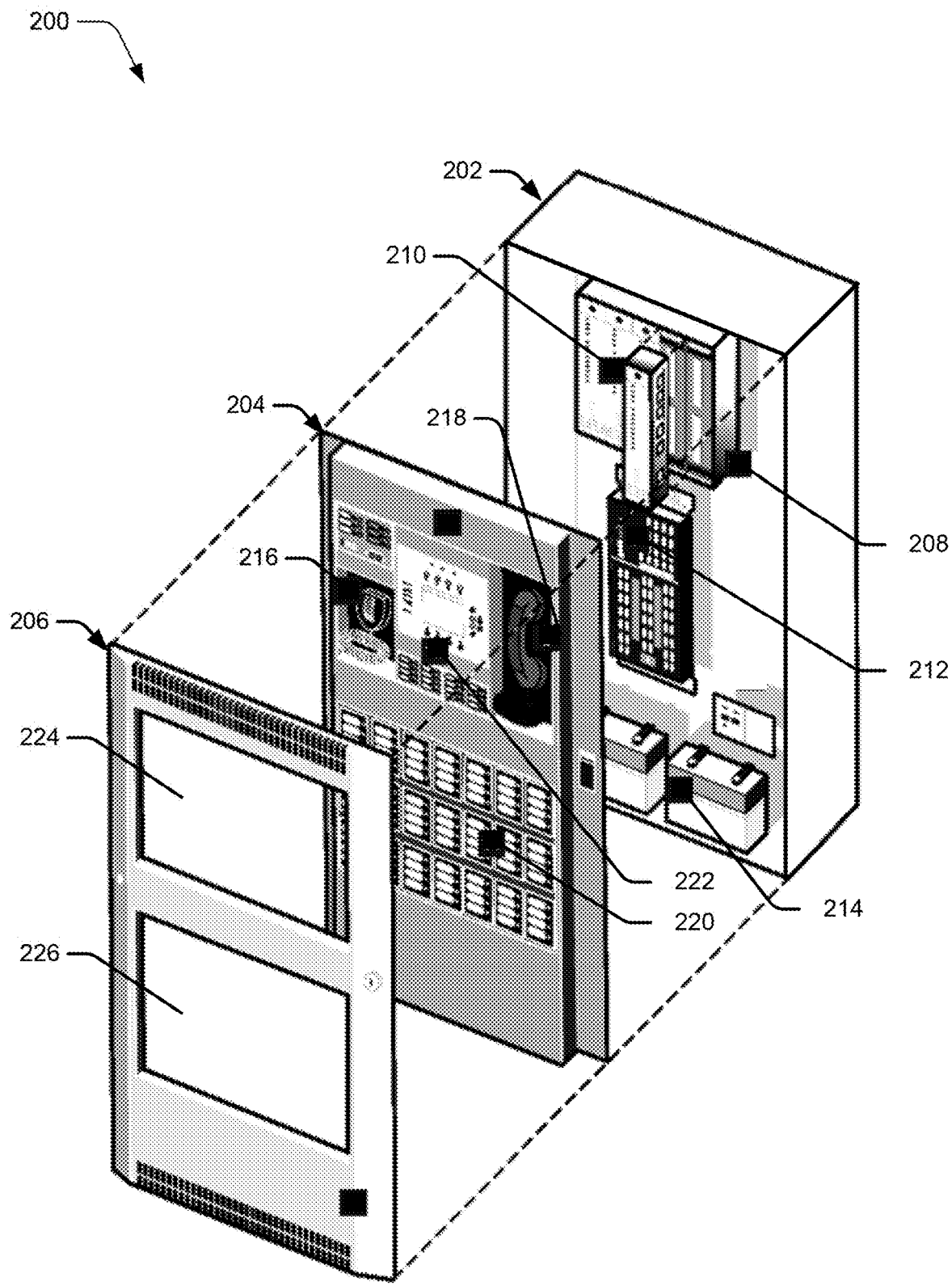
FIG. 2 is an exploded view of an example implementation of the control panel of FIG. 1.

Referring to FIG. 2, there is shown an example control panel 200 that may be utilized for the alarm system. The control panel 200 includes a back box 202, an inner door mounting plate 204, and an outer door 206, in which the outer door is positioned over the inner door mounting plate to secure and/or protect the inner door mounting plate adjacent to the back box. The back box 202 of the control panel 200 includes a line card cage 208, one or more line cards (also known as line cards) 210, a power supply 212, and one or more batteries 214. The line card cage 208 is capable of supporting the line card or cards 210, such as an operation line card and/or a timing line card for the notification appliance circuit. For example, as illustrated in FIG. 2, the line card cage 208 may include multiple compartments in which each compartment includes an electrical interface. A line card 210 may be inserted in a particular compartment of the line card cage 208 for connecting with the corresponding electrical interface and communicating with other components of the alarm system, and the line card may be removed from the particular compartment for disconnecting from the corresponding electrical interface. The operation line card and/or a timing line card, in particular, may be configured to manage electrical current of a notification appliance circuit by the charge division multiplexing technique. The power supply 212 provides electrical power to the various components of the control panel 200, and the batteries 214 provide additional electrical power to the various components where the electrical power provided by the power supply is insufficient or unavailable.

The inner door mounting plate 204 includes a master microphone 216, a master telephone 218, one or more control modules 220, and a user interface 222. The master microphone 216 may be used for one-way communications to speakers and other audio output devices of the alarm system to emit voice announcements. The master telephone 218 may be used for two-way communications with other two-way devices within, or in communication with, the alarm system. The control modules 220 configures the control panel 200 for general operations such as controlling output devices, input devices, fans, switches, and lighting of the alarm system that are connected to and managed by the control panel. The user interface 222 allows a user to interact, monitor, and control various functions of the control panel 200, such as an operator interface.

The outer door 206 of the control panel 200 provides general support and protection of the components of the back box 202 and the inner door mounting plate 204. The outer door 206 also provides access to certain components of the inner door mounting plate 204 to a user. For example, as shown in FIG. 2, the outer door 206 may include a first outer door opening 224 which provides access to the master microphone 216, the master telephone 218, and the user interface 222 of the inner door mounting plate 204 and a second outer door opening 226 which provides access to the control modules 220 of the inner door mounting plate.

Notification appliances require connection to a specialized electrical energy source, such as the notification appliance circuit. Power, synchronization, and/or communication signals to the notification appliance circuit are provided by the control panel 200, such as the notification appliance circuit driver or line card 210 located within the control panel. Connected notification appliances may operate at repetitive and periodic rates. For example, strobes may operate at about 1 flash per predetermined time period, such as one second. For these embodiments, much of the electrical energy stored within the notification appliance is consumed during flash and should be replenished by the notification appliance circuit before the next flash occurrence. This replenishment results in a momentarily high inrush, i.e., electrical current surge. Inrush current by an individual notification appliance may be relatively high and increases as more appliances are placed on a single common notification appliance circuit. Inrush currents on the notification appliance circuit increase additively based on the number of appliances. This inrush places an excessive demand on the power supply and field wiring of the control panel 200, such as the notification appliance circuit line card 210. This excessive demand forces impractical and expensive designs for the notification appliance circuit driver and/or line card while introducing undesirable field wiring constraints and disturbances.

Figure 3:
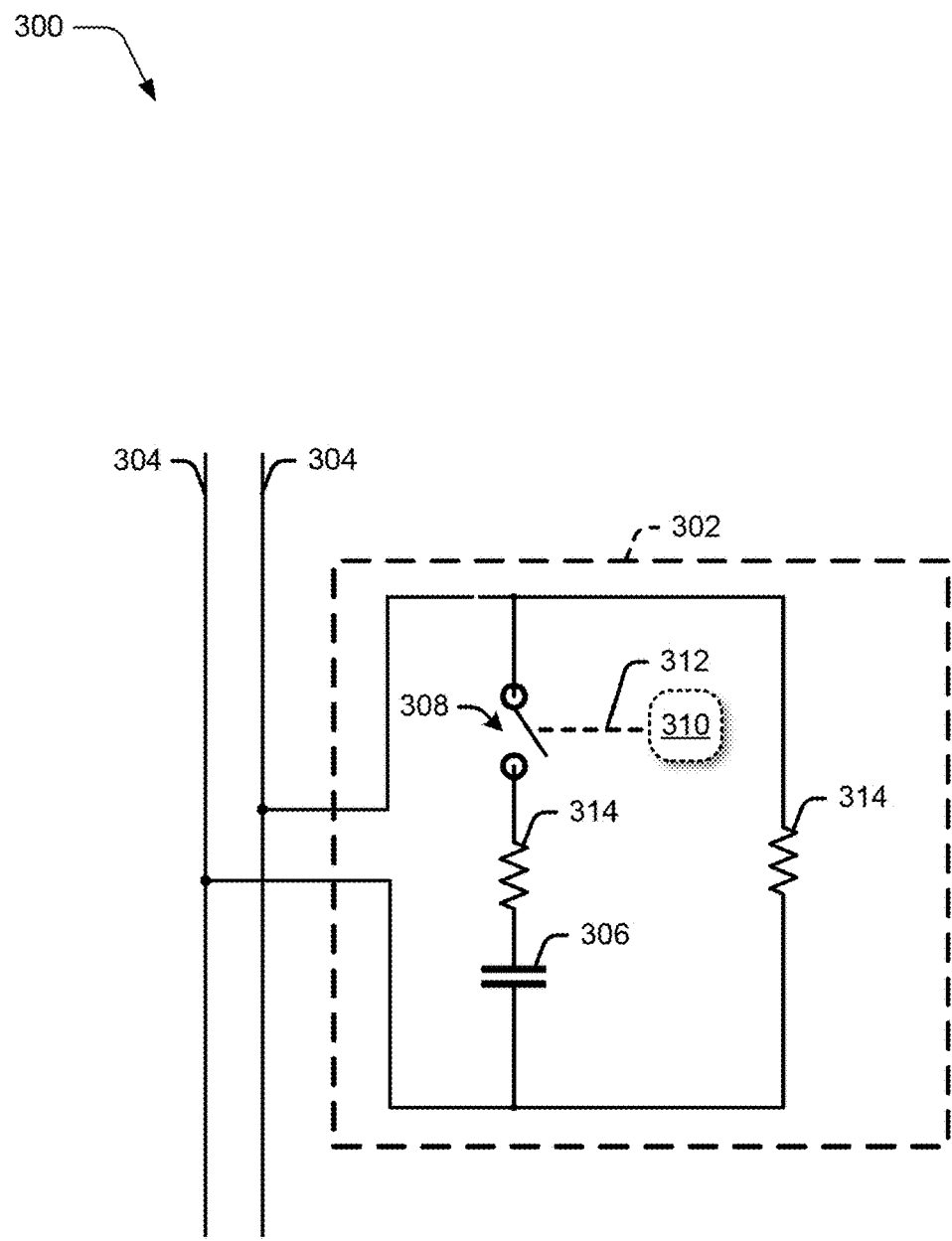
FIG. 3 is a circuit diagram of a simplified example implementation of the appliance of FIG. 1.

Referring to FIG. 3, there is shown a simplified diagram 300 representing select components of a typical notification appliance 302 connected to a portion of the notification appliance circuit 304. The notification appliance 302 includes an energy storage component, such as a high-value capacitor 306, that may be selectively connected or disconnected from a main power source of the control panel 200, via the portion of the notification appliance circuit 304, by a switching mechanism ("switch") 308 operable by a controlling mechanism 310. Examples of the switching mechanism 308 include, but are not limited to, transistors, MOSFETs, or other power controlling devices. The controlling mechanism 310 may be an internal microcontroller of the notification appliance 302 coupled by a wired or wireless link 312 to the switching mechanism 308 or an external controller of the alarm system, located at the control panel 200 or elsewhere, in communication with the switch via the link. At a determined point in time, the switching mechanism 308 is closed to allow the energy storage component 306 to be charged. Each notification appliance 302 includes other components 314 to facilitate operation the switching mechanism 308 and the remaining components of the appliance.

Figure 4:
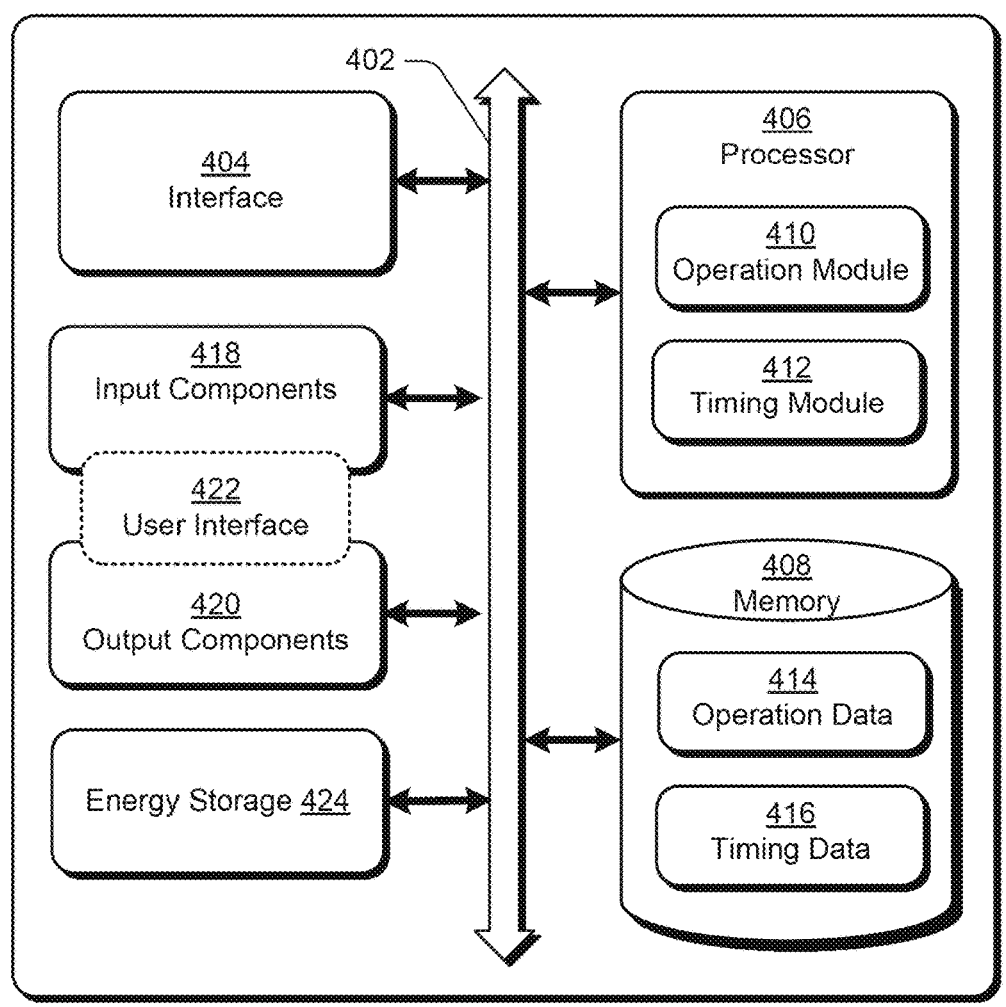
FIG. 4 is a block diagram of an example implementation of the appliance of FIG. 1.

FIG. 4 represents example device components 400 of a typical notification appliance 122, 302 of the building management system 100. An example of a notification appliance includes, but is not limited to, strobes, horns, bells, or any other type of visual and/or audible public signaling devices that includes circuitry for operation with a control panel 120, 200 and a notification appliance circuit 124, 304. The device components 400 of the appliance 122 comprise a communication bus 402 for interconnecting the other device components directly or indirectly, one or more interface components 404 communicating other entities of the alarm system via a wired or wireless link, one or more processors 406, and one or more memory components 408. The interface component 404 may utilize wired technology for transmission of power and/or communication of data over a physical conduit. e.g., an electrical wire, electrical cable, or optical fiber. The interface component 404 of the device components 400 may also include other forms of transmission or communication, such as wireless communications, such as, but are not limited to. Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology.

The processor 406 may execute code and process data received from other components of the device components 400, such as information received at the interface component 404 or stored at the memory component 408. The code associated with the notification appliance 122 and stored by the memory component 408 may include, but is not limited to, operating systems, applications, modules, drivers, and the like. An operating system includes executable code that controls basic functions of the notification appliance, such as interactions among the various components of the device components 400, communication with external devices via the interface component 404, and storage and retrieval of code and data to and from the memory component 408. Each application includes executable code to provide specific functionality for the processor 406 and/or remaining components of the notification appliance. Examples of applications executable by the processor 406 include, but are not limited to, an operation module 410 to manage current draw of a notification appliance and a timing module 412 to manage the timing for the current draw. Data is information that may be referenced and/or manipulated by an operating system or application for performing functions of the intermediate device. Examples of data associated with the building management system 100 and stored by the memory component 408 may include, but are not limited to, operation data 414 including parameters for managing current draw of a notification appliance and timing data 416 to identify parameters for managing the timing for the current draw, such as time delays and time intervals for operating the particular appliance.

The device components 400 of notification appliance 122 may include one or more input components 418 and/or one or more output components 420. The input components 418 of the device components 40 may include one or more usual, audio, mechanical, and/or other components. For some embodiments, the input components 418 and the output components 420 of the notification appliance 122 may comprise a user interface 422 for interaction with a user of the notification appliance. The user interface 422 may include a combination of hardware and software to provide a user with a desired user experience, such as an opportunity to configure the plurality of notification appliances with the time delays. For example, the user interface 422 may include one or more input components 418 to allow the user to enter configuration information and one or more output components 420 to provide configuration information to the user. Although the user interface 422 may include all input components 418 and all output components 420, the user interface may also be directed to a specific subset of input components and/or output components. Other than the user interface 422, each notification appliance 122 may be configured by a configuration device that provides the time delays to the corresponding notification device. For example, the configuration device may be the control panel, an off-site production device, or an on-site commissioning device that communicates with the notification appliance 122 via one or more interface components 404 and/or one or more input components 418.

The device components 400 may further comprise an energy storage component 424. Examples of the energy storage component 424 include, but are not limited to, a capacitor, a battery, or other form of electrical energy storage. The notification appliance 122 may store electrical current drawn from the control panel 120 at the energy storage component 424, whether drawn during power-up or subsequent re-charging of the energy storage component 424.

It is to be understood that FIG. 4 is provided for illustrative purposes only to represent examples of the device components 400 of a notification appliance 122 and is not intended to be a complete diagram of the various components that may be utilized by the appliance. Therefore, notification appliance 122 may include various other components not shown in FIG. 4, may include a combination of two or more components, or a division of a particular component into two or more separate components, hardware, firmware, or a combination thereof, and still be within the scope of the present invention.

Figure 5:
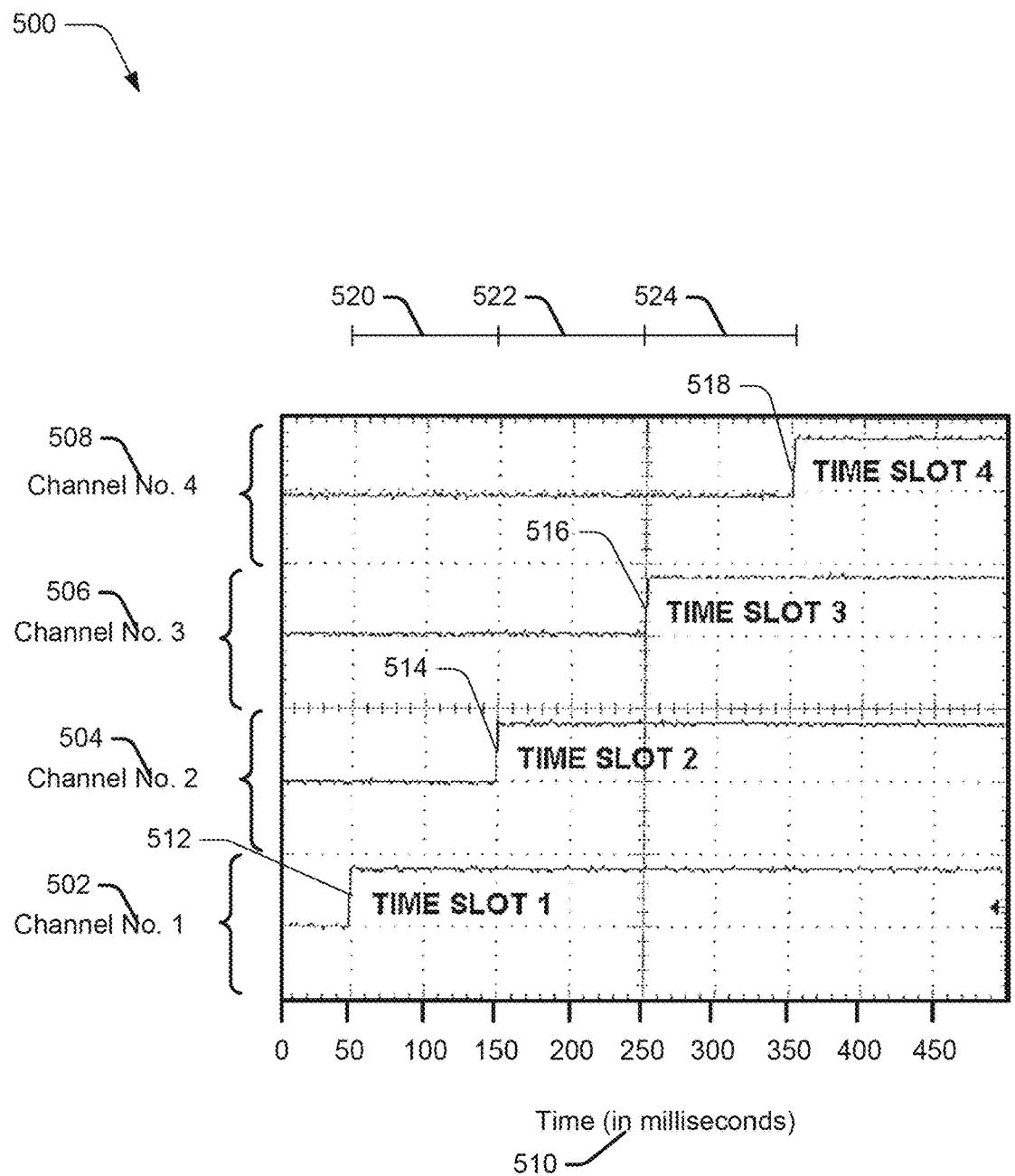
FIG. 5 is a timing diagram of example switch control signals that may be implemented in the appliances of FIG. 1.

Referring to FIG. 5, there is shown a timing diagram 500 of example switch control signals that may be implemented in the notification appliances 122. Four example simulated loads, in the form of channels 502-508, are shown by the y-axis relative to time 510, in milliseconds, shown by the x-axis. The line graph representation for each channel 502-508 corresponds to signal provided to the switching mechanism 308 by the controlling mechanism 310 for each notification appliance 302. The first channel 502 includes a first signal 512 that activates the switching mechanism 308 of a first notification appliance at a first time (for example, 50 msec.), the second channel 504 includes a second signal 514 that activates the switching mechanism of a second notification appliance at a second time (for example, 150 msec.), the third channel 506 includes a third signal 516 that activates the switching mechanism of a third notification appliance at a third time (for example, 250 msec.), and the fourth channel 508 includes a fourth signal 518 that activates the switching mechanism of a fourth application appliance at a fourth time (for example, 350 msec.). A first time period 520 represents a first delay between the loads of the first and second signals 512, 514, a second time period 522 represents a second delay between the loads of the second and third signals 514, 516, and a third time period 524 represents a third delay between the loads of the second and third signals 516, 518. Thus, the first, second, third, and fourth notification appliances are activated in order and in sequence such that the delay for between each pair of sequential appliances is a determined time period.

Each notification appliance 122 performs a charge division multiplexing technique to minimize the additive effect of simultaneous charging or recharging by the group of notifications appliances. In particular, each notification appliance 122 switches-on its charging circuit at different times in order to separate the inrush currents into isolated, or semi-isolated, time slots. The timing diagram 500 represents the time slots allocated to the channels 502-508 when operating the switching mechanism 308 based on the charge division multiplexing technique. As shown in FIG. 5, the switching time between notification appliances may be delayed by any suitable time. For some embodiments, the time periods 520-524 may be substantially equal, such as the 100 millisecond time periods 520-524 shown by the embodiment of FIG. 5. For other embodiments, the time periods 520-524 may vary in which the time periods are not substantially equal.

Figure 6:
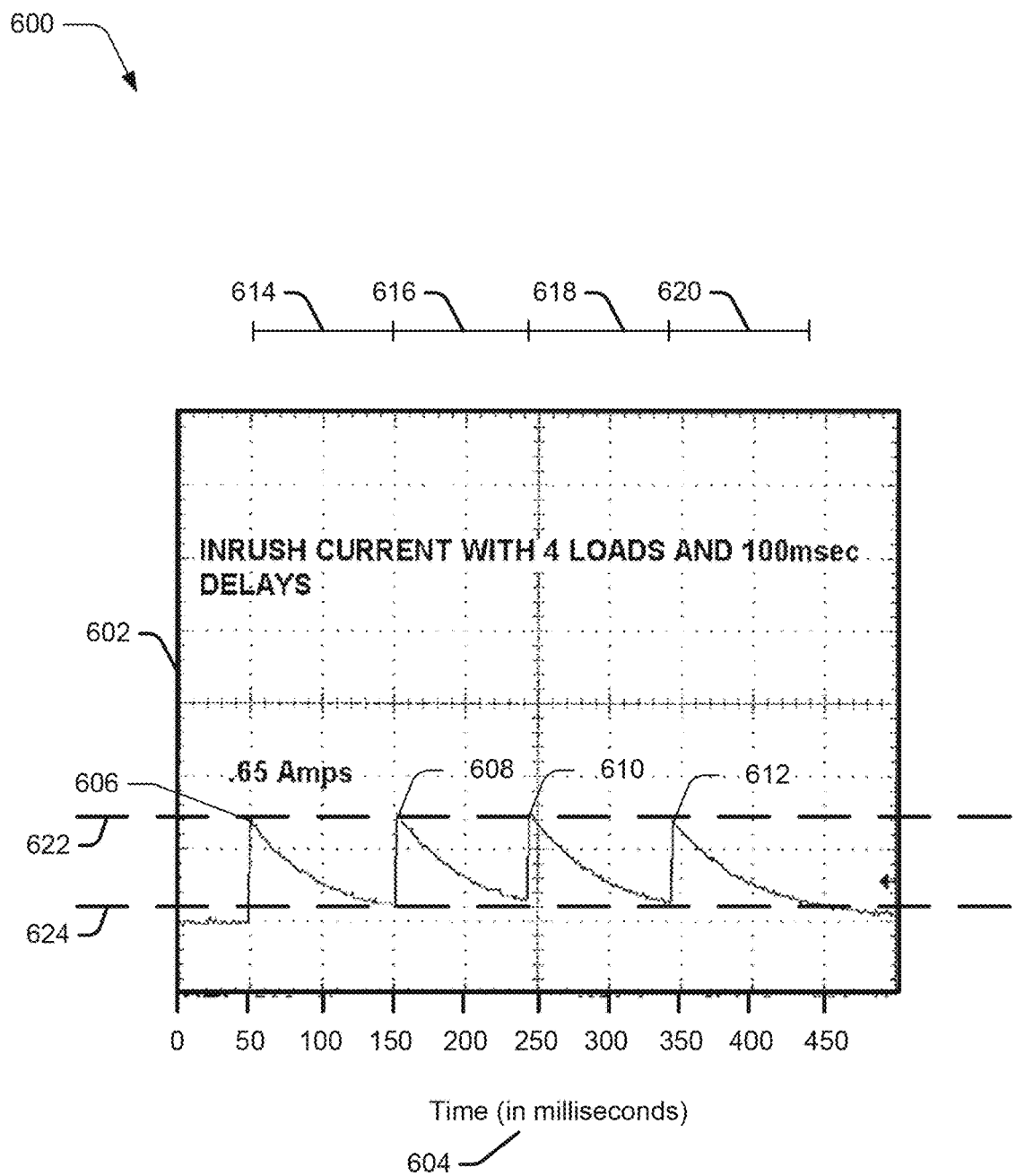
FIG. 6 is a timing diagram of an example electrical current conducted via the notification appliance circuit of FIG. 1.

Referring to FIG. 6, there is shown a timing diagram 600 of an example electrical current conducted via the notification appliance circuit 124. The example shown in FIG. 6 simulates the resulting behavior of the four example loads (appliances) represented by channels 502-508 of FIG. 5. The electrical current drawn by the notification appliances, in amperes, is shown by the y-axis 602 relative to time 604, in milliseconds, shown by the x-axis. The line graph representation of the four loads illustrates the electrical current drawn by the notification appliances by all four loads. As shown in FIG. 6, the first load 606, the second load 608, the third load 610, and the fourth load 612 peak at substantially the same level so the time intervals for drawing current from the control panel are substantially discrete. Since the four notification appliances are activated in sequence, the current drawn by the load of the first channel 502 corresponds to the first time period 614 of the signal, the current drawn by the load of the second channel 504 corresponds to the second time period 616 of the signal, the current drawn by the load of the third channel 506 corresponds to the third time period 618 of the signal, and the current drawn by the load of the fourth channel 508 corresponds to the fourth time period 620 of the signal. Thus, as the notification appliances 122 are configured with time delays, notification appliances recharge energy storage components at different time intervals based on the time delays in response to discharging the energy storage components.

For some embodiments, such as the embodiment illustrated by FIG. 6, the maximum and minimum inrush currents 622, 624 are consistent and similar since the time periods 614-620 for each load is sufficient to allow substantial re-charge of the energy storage component for each notification appliance before initiating re-charge for the next subsequent notification appliance. For these embodiments, the maximum inrush current 622 presented to the power supply of the control panel 120 and subjected to the notification appliance circuit 124 does not exceed the peaks of the first, second, third, and fourth loads. For the example shown in FIG. 6, the maximum inrush current 622 does not exceed 0.65 amperes. Similarly, the minimum inrush current 624 presented to the power supply of the control panel 120 is substantially similar for the time periods 614-620 of all notification appliances.

Figure 7:
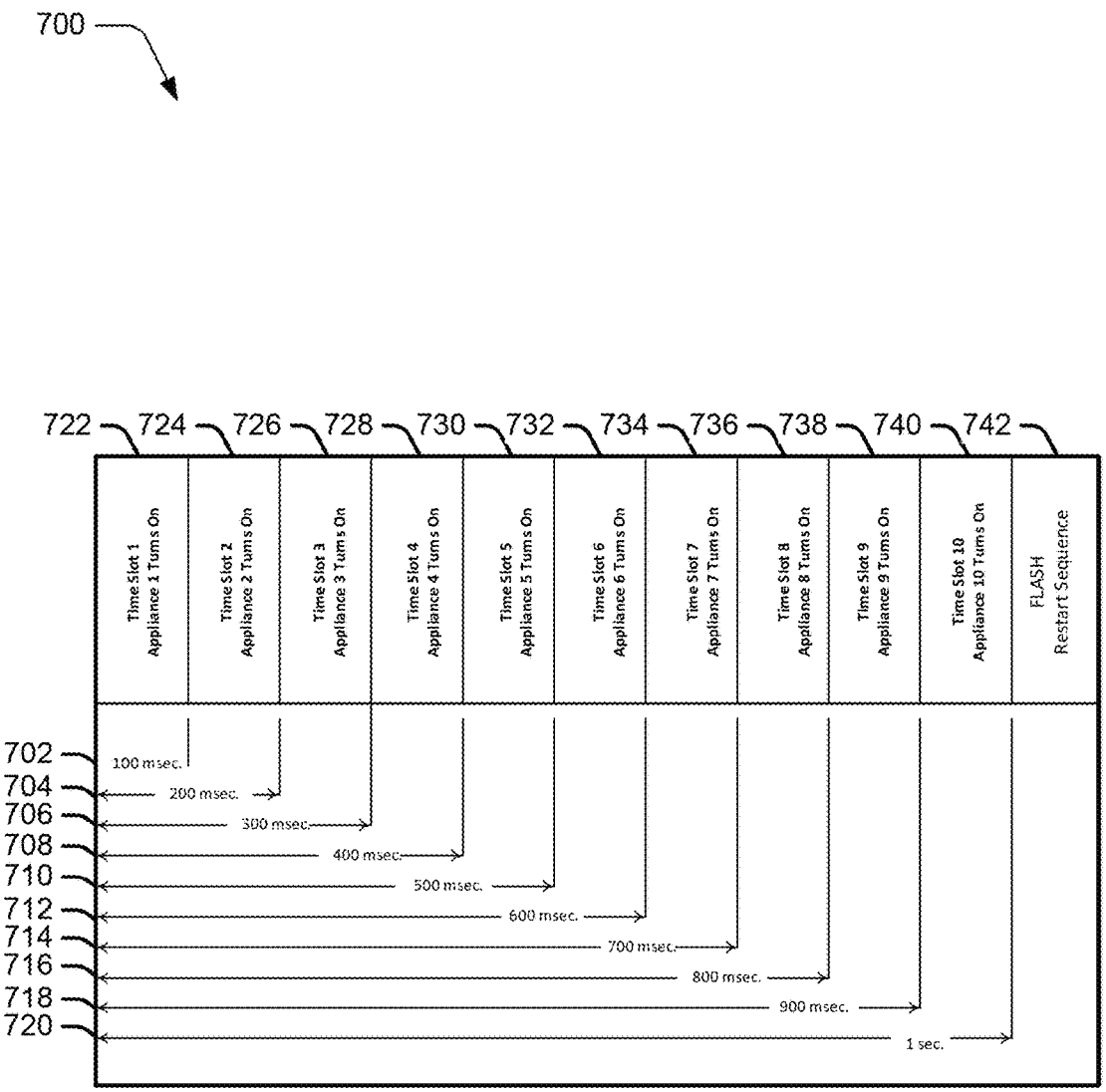
FIG. 7 is a schematic representation of a time slot sequence of notification appliances, such as the notification appliances of FIG. 1.

Referring to FIG. 7, there is shown a schematic representation of a time slot sequence 700 of notification appliances. The representation of FIG. 7 is similar to the representation of FIG. 6, but FIG. 7 represents ten notification appliances whereas FIG. 6 represents four notification appliances. If each notification appliance has a maximum inrush of a determined current that lasts for a time period of x msec. (such as the 100 msec. shown in FIG. 7), then ten notification appliances may be placed on a single notification appliance circuit with a power supply of at least the determined current for 10x msec. (such as the 1 sec. shown in FIG. 7).

Each notification appliance 702-720 has its own charging time slot 722-740. Thus, for the example shown, the first notification appliance 702 may have a first time slot 722 and configured with a first time delay of 0 msec., the second notification appliance 704 may have a second time slot 724 and configured with a second time delay of 100 msec., the third notification appliance 706 may have a third time slot 726 and configured with a third time delay of 200 msec., the fourth notification appliance 708 may have a fourth time slot 728 and configured with a fourth time delay of 300 msec., the fifth notification appliance 710 may have a fifth time slot 730 and configured with a fifth time delay of 400 msec. Likewise, the example shown in FIG. 7, the sixth notification appliance 712 may have a sixth time slot 732 and configured with a sixth time delay of 500 msec., the seventh notification appliance 714 may have a seventh time slot 734 and configured with a seventh time delay of 600 msec., the eighth notification appliance 716 may have an eighth time slot 736 and configured with an eighth time delay of 700 msec., the ninth notification appliance 718 may have a ninth time slot 738 and configured with a ninth time delay of 800 msec., and the tenth notification appliance 720 may have a tenth time slot 740 and configured with a tenth time delay of 900 msec. For all embodiments, at the end of the final time slot 742 (such as the tenth time slot 740 at 1 sec.), the notification appliances 702-720 will repeat the sequence (722-740) until discontinued by the control panel.

It should be noted that a "time slot" includes the offset delay plus the charge or recharge time of a notification appliance. Once the charge switch is activated, it remains on for the remainder of the designated time frame and only resets after the next energy usage, such as strobe flash. Also, the overall time period shown in FIG. 7 is merely an example, and the overall time period is not limited to one second. The overall time period may be any time period based on a specific application. Further, it may be advantageous to minimize the time delays in a time period of less than the maximum available frame time in order to allow enough margin to ensure that all notification appliances fully or substantially charge or recharge within the available time.

Figure 8:
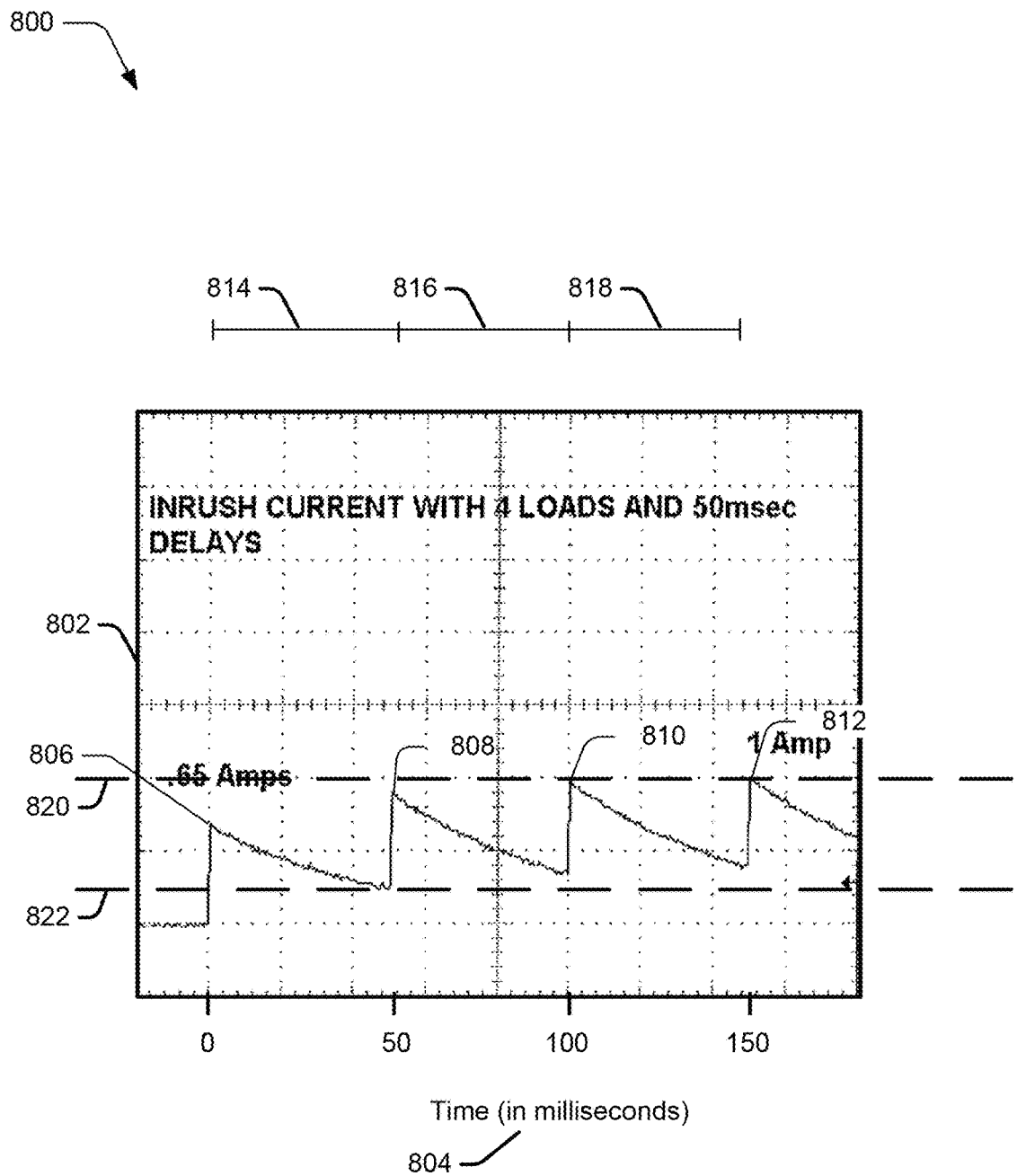
FIG. 8 is a timing diagram of another example electrical current conducted via the notification appliance circuit of FIG. 1.

Referring to FIG. 8, there is a timing diagram 800 of another example electrical current conducted via the notification appliance circuit. The electrical current drawn by the notification appliances, in amperes, is shown by the y-axis 802 relative to time 804, in milliseconds, shown by the x-axis. The line graph representation of the four loads illustrates the electrical current drawn by the notification appliances by all four loads. As shown in FIG. 8, the first load 806, the second load 808, and the third load 810 peak at increasingly higher levels but the fourth load 812 peaks at a level substantially level to the peak of the third level. Thus, for the example shown, the peaks level-off between the third and fourth loads 810, 812. The increase of the peaks for the first few loads 806-810 represents time intervals that overlaps at least in part, thus cause each subsequent load to be greater than its previous load. As in the previous embodiment of FIG. 6, the notification appliances are configured with time delays, notification appliances recharge energy storage components at different time intervals based on the time delays in response to discharging the energy storage components.

The time periods 814-818 are sufficient to allow substantial re-charge of the energy storage component for each notification appliance before initiating re-charge for the next subsequent notification appliance even though, in contrast to the timing diagram 600 of FIG. 6, the time intervals of this embodiment overlap. For the embodiment illustrated by FIG. 8, the maximum inrush current 820 corresponds to the peak current drawn during activation of latter notification appliances, and the minimum inrush current 822 corresponds to the lowest recharge current level of the earlier notification appliances. Even so, the alarm system manages electrical current of a notification appliance circuit for proper operation since the maximum inrush current 820 does not exceed the capabilities of the power supply of the control panel 120 and the notification appliance circuit 124. For the example shown in FIG. 8, the maximum inrush current 820 does not exceed 1.00 ampere.

The time delay between charging slots may vary but the time delays are dependent on the number of Loads, i.e., notification appliances, that may be used on a single notification appliance circuit, the energy requirements of the appliances (such as the brightness of a strobe appliance), and the maximum capacity of the power supply of the control panel. In contrast to the timing diagram of FIG. 6, the timing diagram 800 of FIG. 8 shows an embodiment with a shorter time delay. The additive effect remains for the timing diagram 800 because the previous loads have not fully or substantially charged up when the next load is applied. The maximum inrush current 820 on the last load rises to 1.00 ampere. This level of inrush current may be acceptable dependent on the maximum power capacity of the control panel.

Figure 9:
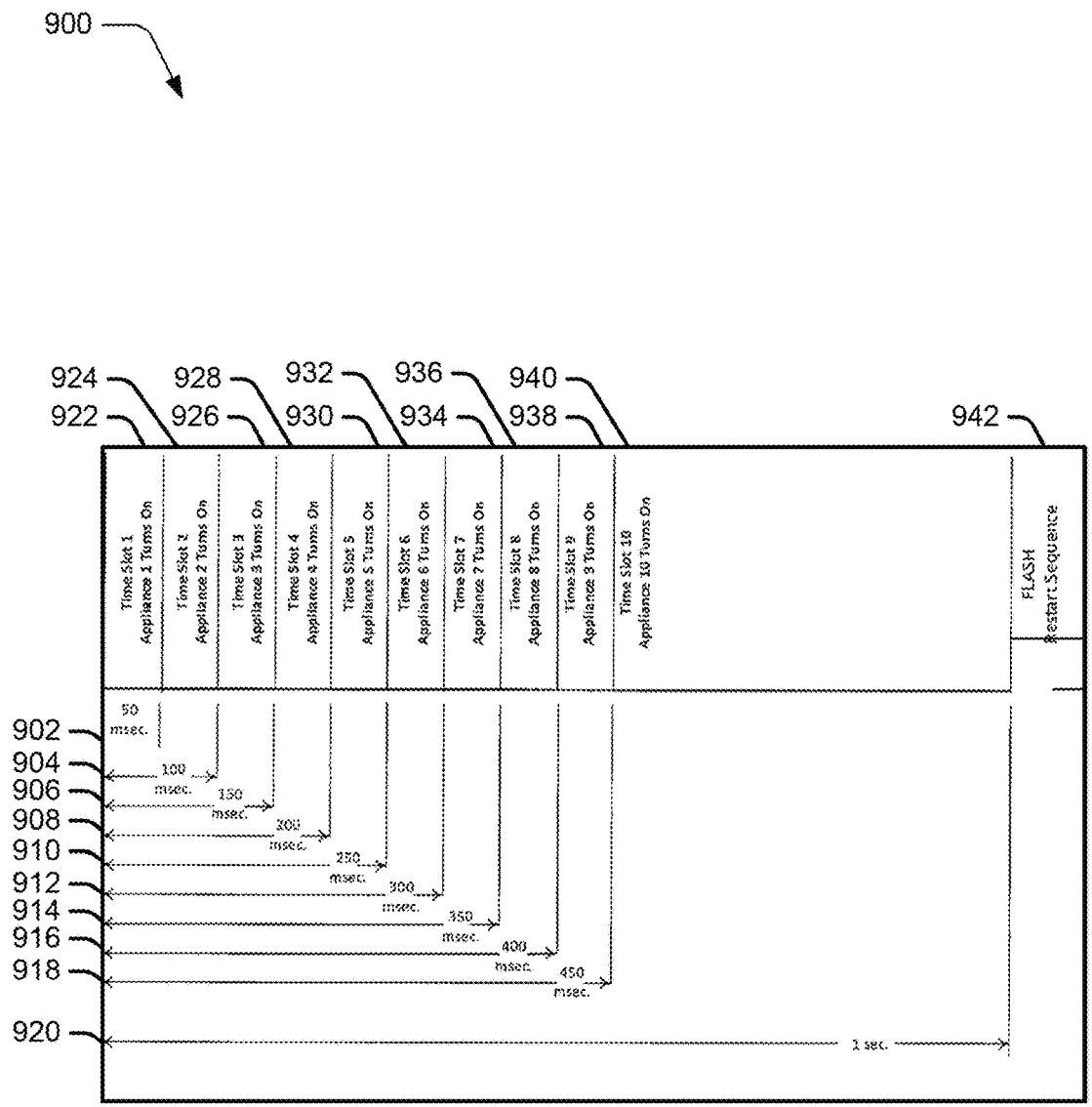
FIG. 9 is a schematic representation of another time slot sequence for notification appliances, such as the notification appliances of FIG. 1.

Referring to FIG. 9, there is shown a schematic representation of another time slot sequence 900 for notification appliances. For this time slot sequence 900 of FIG. 9 is different from the time slot sequence 700 of FIG. 7 in that the time period for each time slot (and for each notification appliance) is shorter. For the example, each time period shown for the time slot sequence 700 of FIG. 7 is 100 msec, whereas each time period shown for the time slot sequence 900 of FIG. 9 is 50 msec. Since the time period for each time slot is less than the time period needed by each notification appliance to full recharge, time intervals for recharging the notification appliances overlaps at least in part.

In particular, each notification appliance 902-920 has its own charging time slot 922-940. Thus, for the example shown, the first notification appliance 902 may have a first time slot 922 and configured with a first time delay of 0 msec., the second notification appliance 904 may have a second time slot 924 and configured with a second time delay of 50 msec., the third notification appliance 906 may have a third time slot 926 and configured with a third time delay of 100 msec., and so on. For all embodiments, at the end of the final time slot 942, the notification appliances 902-920 will repeat the sequence (922-940) until discontinued by the control panel.

Figure 10:
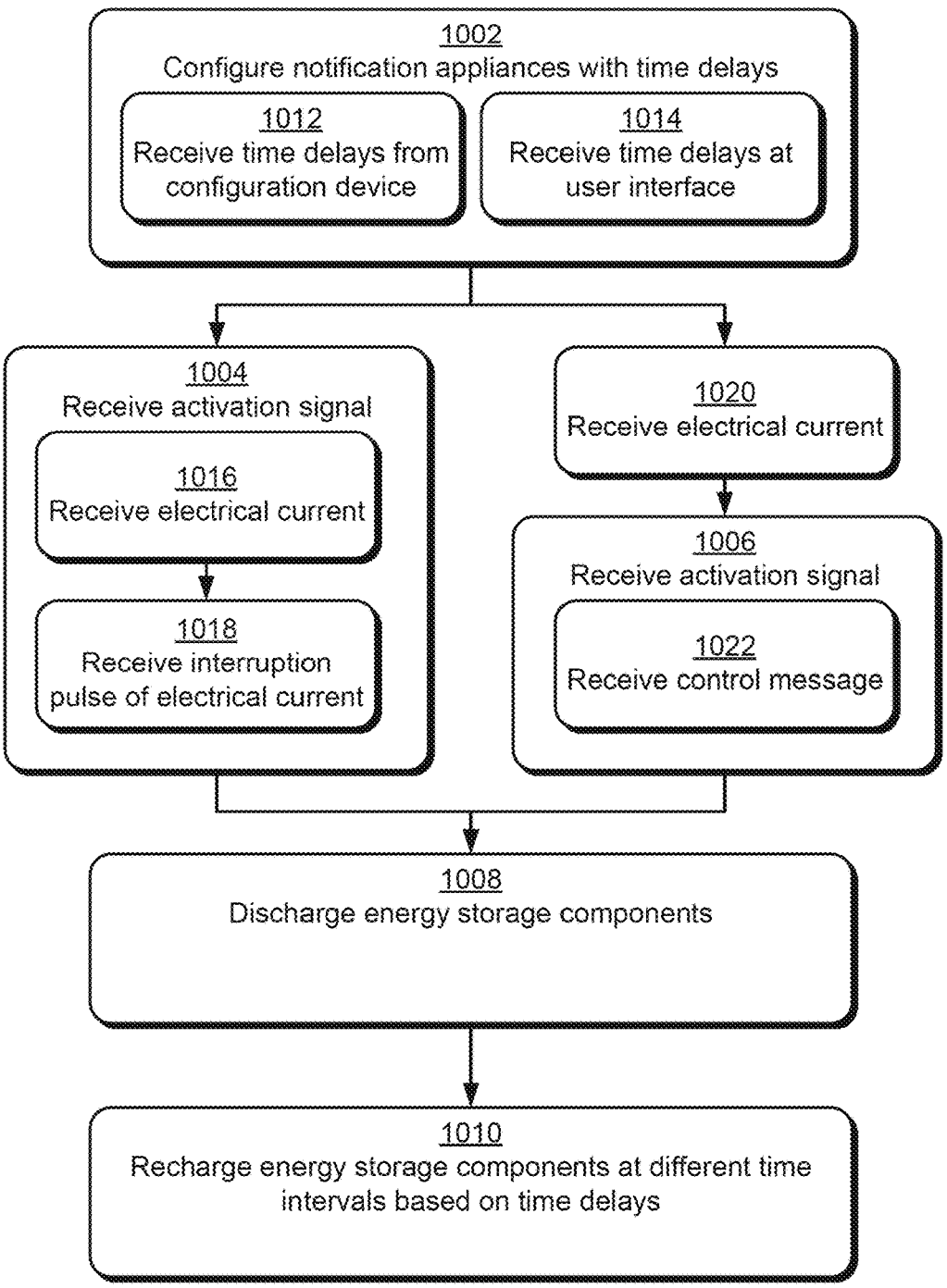
FIG. 10 is a flow diagram of an example implementation of the notification appliances, of FIG. 1, operable to employ techniques described herein.

Referring to FIG. 10, there is shown a flow diagram of an example implementation of the notification appliances, of FIG. 1, operable to employ techniques described herein. The notification appliances 122 may be configured 1002 with time delays. The notification appliances 122 may then receive 1004, 1006 an activation signal in response to an emergency condition from a control panel 120 coupled to the notification appliances via a notification appliance circuit 124. Thereafter, the notification appliances 122 may discharge 1008 energy storage components based on at least the activation signal and recharge 1010 the energy storage components at different time intervals based on the time delays in response to discharging the energy storage components.

For some embodiments, when configuring 1002 each notification appliance 122, each notification appliance may receive 1012 data associated with a time delay from a configuration device. Examples of the configuration device includes, but are not limited to, the control panel, an off-site production device, or an on-site commissioning device. For other embodiments, each notification appliance 122 may receive 1014 data associated with a time delay at a user interface of the corresponding notification appliance.

Some embodiments determine of the number of charge time slots, the time delays between them, and how these delays are assigned to notification appliances on a single notification appliance circuit. The delay length associated with each charge time slot is predetermined based on a maximum expected inrush current and number of notification appliances. For some embodiments, the delay that a notification appliance uses may be selected by its address that is assigned during installation. Also, it should be noted that multiple notification appliances may be assigned to a single time slot. For other embodiments, the delay length may be determined by a main control panel ("PMI") or by a configuration tool based on the number and type of notification appliances assigned to a particular notification appliance circuit. For some embodiments, the time delays, along with other parameters, may be sent to the notification appliances during an initialization phase typically done when a system is powerup or after a reset. For some embodiments, time delays may be set using hardware features such as DIP switches, mechanical selection, or other programmable means, such as a bidirectional communications interface, and stored in nonvolatile memory.

Each notification appliance connected to the notification application circuit may be dynamically commanded by the control panel, such as a driver or line card of the control panel, to identify the timing for activating charging circuits. Charge delay times may be based on the configuration information.

For some embodiments, when receiving 1004 an activation signal in response to an emergency condition, each notification appliance 122 may receive 1016 an electrical current from the control panel 120 via the notification appliance circuit 124. For example, for these embodiments, the activation signal may be the electrical current received from the control panel 120 by the notification appliances 122. Each notification appliance 122 may charge its energy storage component based on the electrical current provided by the control panel 120, and the corresponding notification appliance may discharge the energy storage component after a predetermined time period. As another example, the activation signal may be an interruption pulse of the electrical current that is received from the control panel 120 by the notification appliances 122 to synchronize activations of the notification appliances. Each notification appliance 122 charge its energy storage component based on the electrical current provided by the control panel 120, and the corresponding notification application may discharge the energy storage component in response to the interruption pulse of the electrical current. For either of the above examples, the notification appliances 122 recharge the energy storage components at different time intervals based on the time delays in response to discharging the energy storage components.

For example, the alarm system may have a conventional mode in which the devices may be in a supervision state or an active state. For the supervision state, the notification appliances 122 may not receive power from the notification appliance circuit 124. For the active state, the notification appliance circuit driver of the control panel 120 may control the polarity on the wires of the notification appliance circuit and provides electrical current, which activates the notification appliances. The notification appliance circuit driver may also send periodic short interruptions in power, i.e., interruption pulses, on the line to synchronize the flashes so all notification appliances activate in unison.

For some embodiments, each notification appliance 122 may receive 1020 an electrical current from the control panel 120 via the notification appliance circuit 124 before receiving 1006 the activation signal in response to an emergency condition from the control panel. For these embodiments, the notification appliances 122 receive 1006 the activation signal via the same notification appliance circuit 124 as the electrical current, but the activation signal is different from the electrical current. Each notification appliance 122 may charge its energy storage component based on the electrical current provided by the control panel 120. The activation signal is a control message communicated by the control panel 120 and received by the notification appliances 122 to activate or synchronize activations of the notification appliances. The notification applications 122 may discharge the energy storage components in response to the control message communicated by the control panel 120. In response to discharge, the notification appliances 122 may recharge the energy storage components at different time intervals based on the time delays.

For example, the alarm system may have an addressable mode in which each addressable notification appliances 122 receives 1020 electrical current from the notification appliance circuit 124 continuously. For this example, the control panel 120 may provide an activation signal in the form of a complex waveform that is always present on the line of the notification appliance circuit 124 and the notification appliances 122 are always powered up. The control panel 120 is in continual communication with the notification appliances 122 for supervision purposes. As such, the notification appliances 122 are continually charging their energy storage components. For activation of the notification appliances 122 (i.e., receiving 1006 the activation signal), the notification appliances receive 1022 a control message from the control panel 120. Thus, the recharging of the energy storage components is independent of this control message. Recharging occurs after each activation and is delayed by the configured time delay.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An alarm system for managing current of a notification appliance circuit, the system comprising:
 a notification appliance circuit;
 a control panel coupled to the notification appliance circuit, the control panel providing an activation signal in response to an emergency condition; and
 a plurality of notification appliances coupled to the notification appliance circuit, the plurality of notification appliances being configured with time delays, receiving the activation signal from the control panel, discharging energy storage components based on at least the activation signal, and recharging the energy storage components at different time intervals based on the time delays in response to discharging the energy storage components.

2. The alarm system as described in claim 1, wherein a configuration device provides the time delays to the plurality of notification devices, the configuration device being a device selected from the group consisting of the control panel, an off-site production device, or an on-site commissioning device.

3. The alarm system as described in claim 1, wherein the plurality of notification appliances includes user interfaces to configure the plurality of notification appliances with the time delays.

4. The alarm system as described in claim 1, wherein a plurality of time intervals of the different time intervals is substantially discrete.

5. The alarm system as described in claim 1, wherein a plurality of time intervals of the different time intervals overlaps at least in part.

6. The alarm system as described in claim 1, wherein the activation signal is at least one of an electrical current from the control panel via the notification appliance circuit or an interruption pulse of the electrical current.

7. The alarm system as described in claim 1, wherein:
the control panel provides an electrical current to the notification appliance circuit;
the plurality of notification appliances receive the electrical current from the notification appliance circuit; and
the activation signal is a control message to activate and synchronize activations of the plurality of notification appliances, the activation signal being different from the electrical current.

8. A method of an alarm system for managing current of a notification appliance circuit, the method comprising:
configuring a plurality of notification appliances with time delays;
receiving, by the plurality of notification appliances, an activation signal in response to an emergency condition from a control panel coupled to the plurality of notification appliances via a notification appliance circuit;
discharging, at the plurality of notification appliances, energy storage components based on at least the activation signal; and
recharging, at the plurality of notification appliances, the energy storage components at different time intervals based on the time delays in response to discharging the energy storage components.

9. The method as described in claim 8, wherein configuring the plurality of notification appliances includes receiving the time delays from a configuration device selected from the group consisting of the control panel, an off-site production device, or an on-site commissioning device.

10. The method as described in claim 8, wherein configuring the plurality of notification appliances includes receiving the time delays at user interfaces of the plurality of notification appliances.

11. The method as described in claim 8, wherein a plurality of time intervals of the different time intervals is substantially discrete.

12. The method as described in claim 8, wherein a plurality of time intervals of the different time intervals overlaps at least in part.

13. The method as described in claim 8, wherein receiving the activation signal from the control panel includes at least one of:
receiving an electrical current by the plurality of notification appliances from the control panel via the notification appliance circuit; or
receiving an interruption pulse of the electrical current by the plurality of notification appliances from the control panel via the notification appliance circuit.

14. The method as described in claim 8, further comprising receiving an electrical current by the plurality of notification appliances from the control panel via the notification appliance circuit before receiving the activation signal from the control panel,
wherein receiving the activation signal from the control panel includes receiving a control message to activate and synchronize activations of the plurality of notification appliances, the activation signal being different from the electrical current.

15. A notification appliance of an alarm system for managing current of a notification appliance circuit, the notification appliance comprising:
an interface component configured to receive an activation signal in response to an emergency condition from a control panel coupled to the notification appliances via a notification appliance circuit;
a processor configured with a time delay; and
an energy storage component configured to be discharged based on at least the activation signal and recharged at a time interval based on the time delay in response to discharging the energy storage component.

16. The notification appliance as described in claim 15, wherein the interface component receives the time delay from a configuration device selected from the group consisting of the control panel, an off-site production device, or an on-site commissioning device.

17. The notification appliance as described in claim 15, further comprising a user interface of the notification appliance configured to receive the time delay.

18. The notification appliance as described in claim 15, wherein the time interval of the notification appliance is substantially discrete from a second time interval of a second notification appliance coupled to the control panel via the notification appliance circuit.

19. The notification appliance as described in claim 15, wherein the time interval of the notification appliance overlaps, at least in part, a second time interval of a second notification appliance coupled to the control panel via the notification appliance circuit.

20. The notification appliance as described in claim 15, wherein the activation signal is at least one of an electrical current from the control panel via the notification appliance circuit or an interruption pulse of the electrical current.

21. The notification appliance as described in claim 15, wherein:
the notification appliances receives an electrical current from the control panel via the notification appliance circuit; and
the activation signal is a control message to activate and synchronize activations of the plurality of notification appliances, the activation signal being different from the electrical current.

\* \* \* \* \*